United States Patent [19]

Kutsuwada et al.

[11] Patent Number: 5,729,791
[45] Date of Patent: Mar. 17, 1998

[54] IMAGE FORMING APPARATUS WITH CONTROL TO ALLOW IMAGING OF SECOND GROUP TO INTERRUPT IMAGING OF FIRST GROUP

[75] Inventors: Satoru Kutsuwada, Kawasaki; Yoshihiko Suzuki; Kenji Kobayashi, both of Tokyo, all of Japan

[73] Assignee: Canon Kabushiki Kaisha, Tokyo, Japan

[21] Appl. No.: 812,668

[22] Filed: Mar. 10, 1997

Related U.S. Application Data

[63] Continuation of Ser. No. 715,385, Sep. 13, 1996, abandoned, which is a continuation of Ser. No. 498,783, Jul. 5, 1995, abandoned.

[30] Foreign Application Priority Data

Jul. 6, 1994 [JP] Japan ................................. 6-154667

[51] Int. Cl.[6] ...................................... G03G 21/00
[52] U.S. Cl. .......................... 399/82; 358/400; 399/403
[58] Field of Search ......................... 399/82, 1, 403, 399/85, 87, 19, 18; 347/112; 270/58.14, 58.16, 58.19; 358/296, 300, 442, 400

[56] References Cited

U.S. PATENT DOCUMENTS

| | | | |
|---|---|---|---|
| 4,099,860 | 7/1978 | Connin | 399/87 |
| 4,515,458 | 5/1985 | Masuda et al. | 399/85 |
| 4,864,350 | 9/1989 | Ishiguro et al. | 399/403 X |
| 4,930,761 | 6/1990 | Naito et al. | 270/58.16 |
| 4,986,520 | 1/1991 | Shido et al. | 270/58.14 |
| 5,035,412 | 7/1991 | Hiroi et al. | 270/58.19 |
| 5,040,019 | 8/1991 | Ito | 399/84 X |
| 5,053,831 | 10/1991 | Ishiguro et al. | 399/403 X |
| 5,090,673 | 2/1992 | Kitahara et al. | 270/58.19 |
| 5,166,739 | 11/1992 | Katsuki et al. | 399/401 |
| 5,255,908 | 10/1993 | Hiroi et al. | 270/58.19 |

Primary Examiner—S. Lee
Attorney, Agent, or Firm—Fitzpatrick, Cella, Harper & Scinto

[57] ABSTRACT

An image forming apparatus includes a sorter with a plurality of accommodating units for sorting sheets on which images have been formed. The sorter is detachably mountable to the image forming unit, and has a first control unit for allowing image formation of a second group by interrupting image formation of a first group upon reception of an interrupt instruction to perform image formation of images of the second group while image formation of images of the first group is suspended, and for resuming image formation of the first group after the image formation of the second group has been completed, and a second control unit for changing units to accommodate sheets in the sorter so as to accommodate sheets on which images of the first group have been formed and sheets on which images of the second group have been formed in different accommodating units in accordance with the instruction of the interrupt, a detector for detecting the mounting or detaching of the sorter, and a prohibition unit for prohibiting interrupt of image formation of the second group during image formation of the first group when the detector detects the detaching of the sorter.

19 Claims, 12 Drawing Sheets

IMAGE FORMING APPARATUS WITH CONTROL TO ALLOW IMAGING OF SECOND GROUP TO INTERRUPT IMAGING OF FIRST GROUP

This application is a continuation of application No. 08/715,385, filed Sep. 13, 1996, which is in turn a continuation of application Ser. No. 08/498,783, filed Jul. 5, 1995, both now abandoned.

BACKGROUND OF THE INVENTION

1. Field of the Invention

This invention relates to an image forming apparatus capable of performing image formation on sheets and of sorting the sheets.

2. Description of the Related Art

Image forming apparatuses, each having functions of a copier, a printer, a facsimile apparatus and the like and including a sorter for sorting sheets (a sheet indicating a medium, such as paper, a film or the like, on which an image can be recorded) for each of these functions, have been proposed.

In the above-described apparatuses, when a sorter capable of sorting sheets of a blank form for each function is mounted, it is possible to output sheets in a sorted state even if a copying operation interrupts while sheets are output in a printing operation, a facsimile operation or the like. However, when such a sorter is not mounted, output sheets are mixed and therefore it is difficult to soft them if a copying operation interrupts while sheets are output in a printing, a facsimile operation or the like. If the apparatus is configured such that interrupt of a copying operation is prohibited, a copying operation cannot be started when sheets are intermittently output in a printing operation, a facsimile operation and the like.

SUMMARY OF THE INVENTION

It is an object of the present invention to provide an image forming apparatus which solves the above-described problems.

It is another object of the present invention to provide an image forming apparatus in which by changing control depending on whether or not a sorter is mounted, a sheet-discharging operation can be performed without mixing sheets even if a copying operation is accepted while sheets are output in a printing operation, a facsimile operation or the like, and waiting time for a copying operation can be reduced.

According to one aspect, the present invention, which achieves these objectives, relates to an image forming apparatus comprising image forming means for forming an image on a sheet, and sorting means including a plurality of accommodating commodating units for sorting sheets on which images have been formed by the image forming means. The sorting means is detachably mountable relative to the image forming means. The apparatus further comprises first control means for allowing image formation of a second group by interrupting image formation of a first group upon reception of an interrupt instruction to allow image formation of images of the second group while the image forming means suspends image formation of images of the first group, and for resuming the image formation of the first group after the image formation of the second group has been completed, second control means for changing units to accommodate sheets in the sorting means so as to accommodate sheets on which images of the first group have been formed and sheets on which images of the second group have been formed in different accommodating units in accordance with the instruction of interrupt, detection means for detecting mounting or detaching of the sorting means, and prohibition means for prohibiting interrupt of image formation of the second group during image formation of the first group when the detection means detects detaching of the sorting means.

According to another aspect, the present invention relates to an image forming apparatus comprising image forming means for forming an image on a sheet, control means for allowing image formation of a second group by interrupting image formation of a first group upon reception of an interrupt instruction to allow image formation of images of the second group while the image forming means suspends image formation of images of the first group, and for resuming the image formation of the first group after the image formation of the second group has been completed, detection means for detecting presence or absence of sorting means for sorting sheets on which images have been formed by the image forming means, and prohibition means for prohibiting interrupt of image formation of the second group during image formation of the first group when the detection means detects absence of the sorting means.

The foregoing and other objects, advantages and features of the present invention will become more apparent from the following description of the preferred embodiment taken in conjunction with the accompanying drawings.

DESCRIPTION OF THE PREFERRED EMBODIMENT

Figure 1:
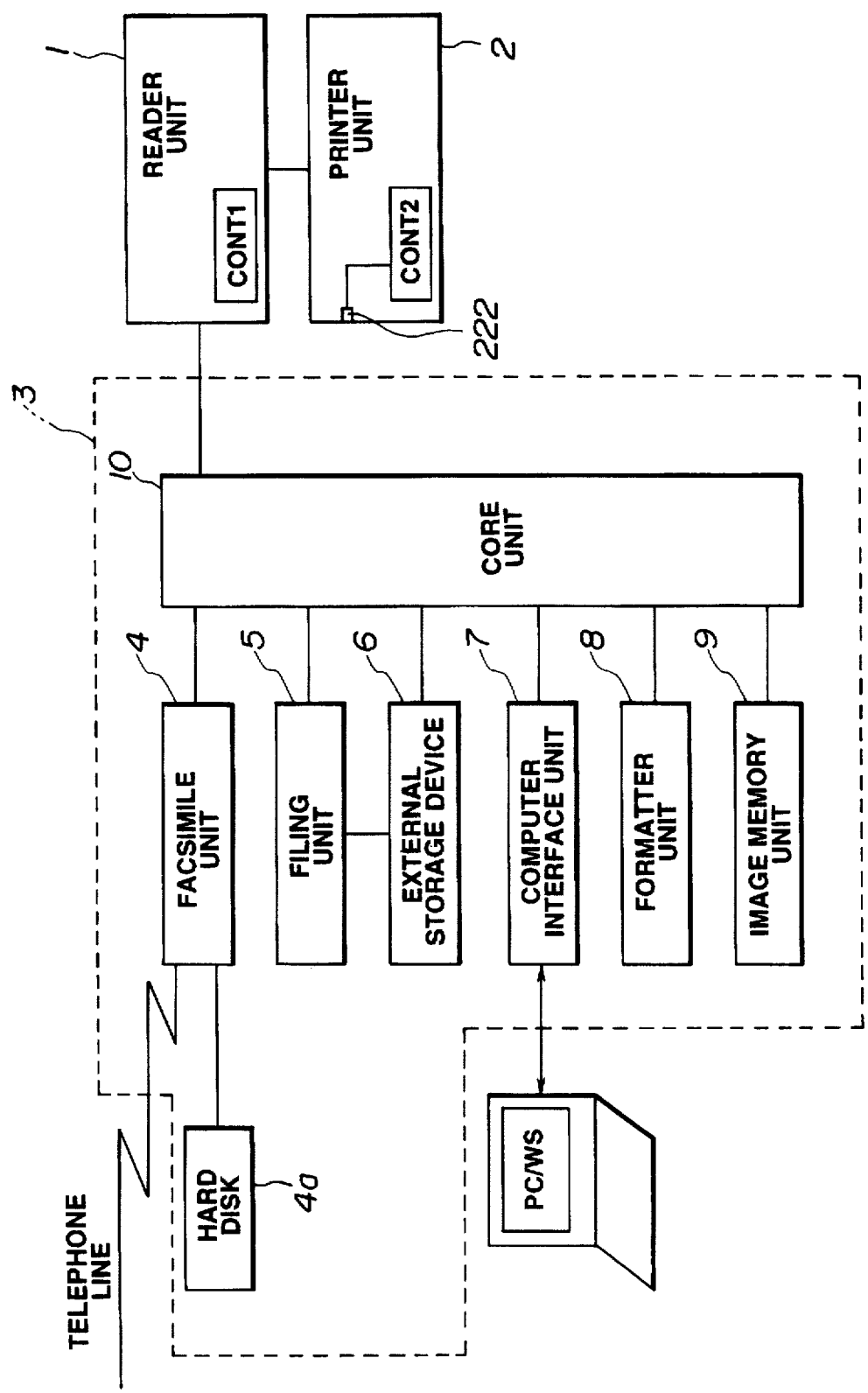
FIG. 1 is a block diagram illustrating the configuration of an image forming apparatus according to an embodiment of the present invention.
Figure 2:
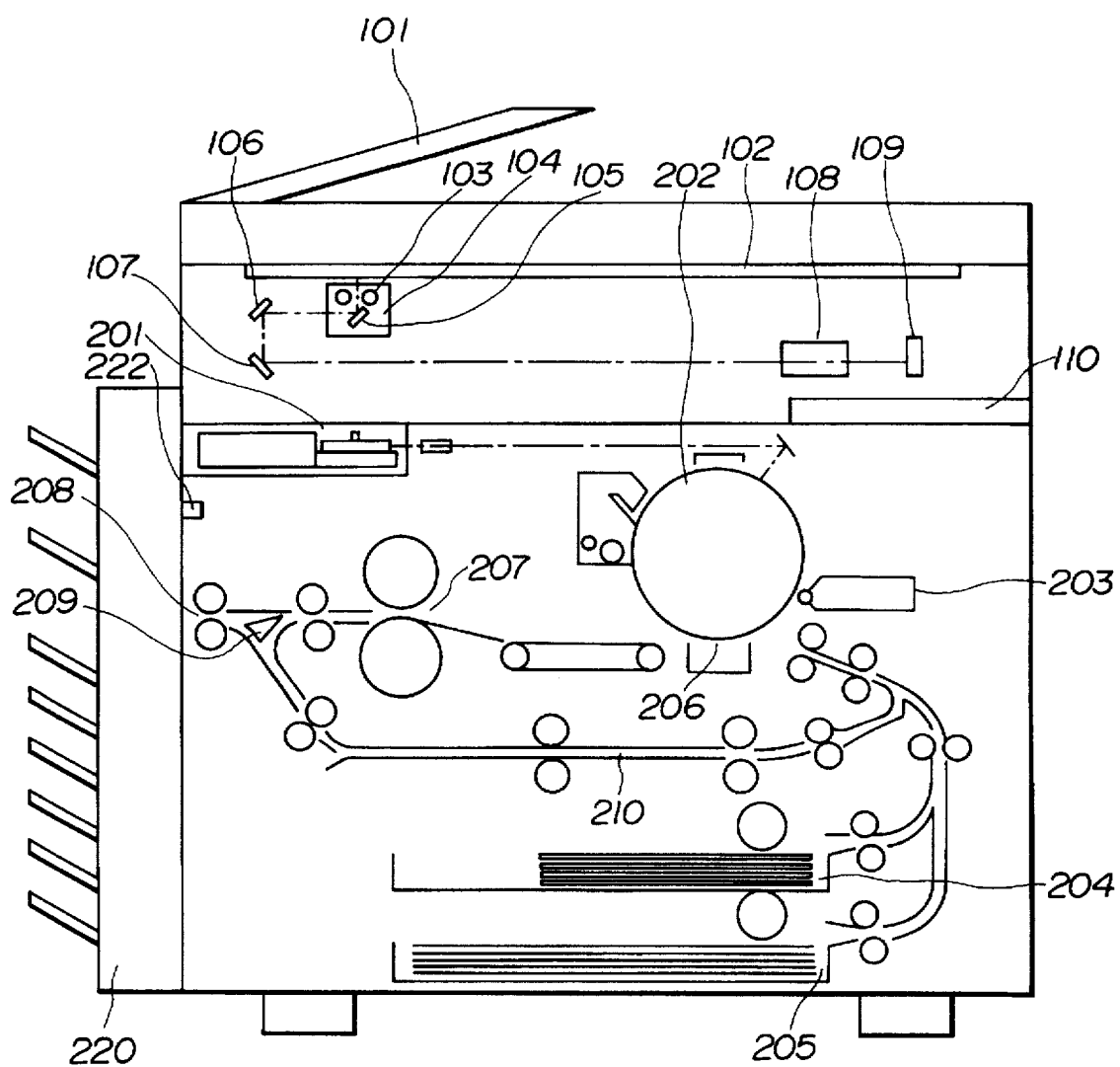
FIG. 2 is a cross-sectional view illustrating the configuration of a reader unit and a printer unit shown in FIG. 1.

FIG. 1 is a block diagram illustrating the configuration of an image forming system according to an embodiment of the present invention. In FIG. 1, an image input device (hereinafter termed a "reader unit") 1 converts an image of an original into image data. An image output device (hereinafter termed a "printer unit") 2 includes a plurality of kinds of sheet cassettes, and outputs the image data onto a sheet in the form of a visual image in response to a printing command. An external apparatus 3 is electrically connected to the reader unit 1, and has various functions. The external apparatus 3 includes a facsimile unit 4, a filing unit 8, an external storage device 6 connected to the filing unit 5, a computer interface unit 7 for connecting the device 3 to computers via a LAN (local area network), a formatter unit 8 for converting information from a computer into a visual image, an image memory unit 9 for storing information from the reader unit 1 and temporarily storing information transmitted from a computer, a core unit 10 for controlling these functional units, and the like. The reader unit 1 includes a reader control unit CONT1 for controlling the reader unit 1, and the printer unit 2 includes a printer control unit CONT2 for controlling the printer unit 2. As seen in FIG. 2, a sensor 222 detects attaching or detaching of a sorter 220 in the printer unit 2.

FIG. 2 is a cross-sectional view illustrating the configuration of the reader unit 1 and the printer unit 2. A description will now be provided of the configuration and the operations of the reader unit 1 and the printer unit 2.

In FIG. 2, originals mounted on an original-feeding device 101 are individually and sequentially fed onto an original-mount glass surface 102. When an original has been fed to a predetermined position on the glass surface 102, a lamp 103 of a scanner unit 104 is lit, and the scanner unit 104 moves to project light onto the original. Reflected light from the original is input to a CCD (charge-coupled device) image sensor unit (hereinafter abbreviated as a "CCD") 109 via mirrors 105, 106 and 107, and a lens 108. The reflected or transmitted light from the original input to the CCD 109 is subjected to photoelectric conversion. An image signal obtained by photoelectric conversion by the CCD 109 is transmitted to an image processing unit 110.

Figure 3:
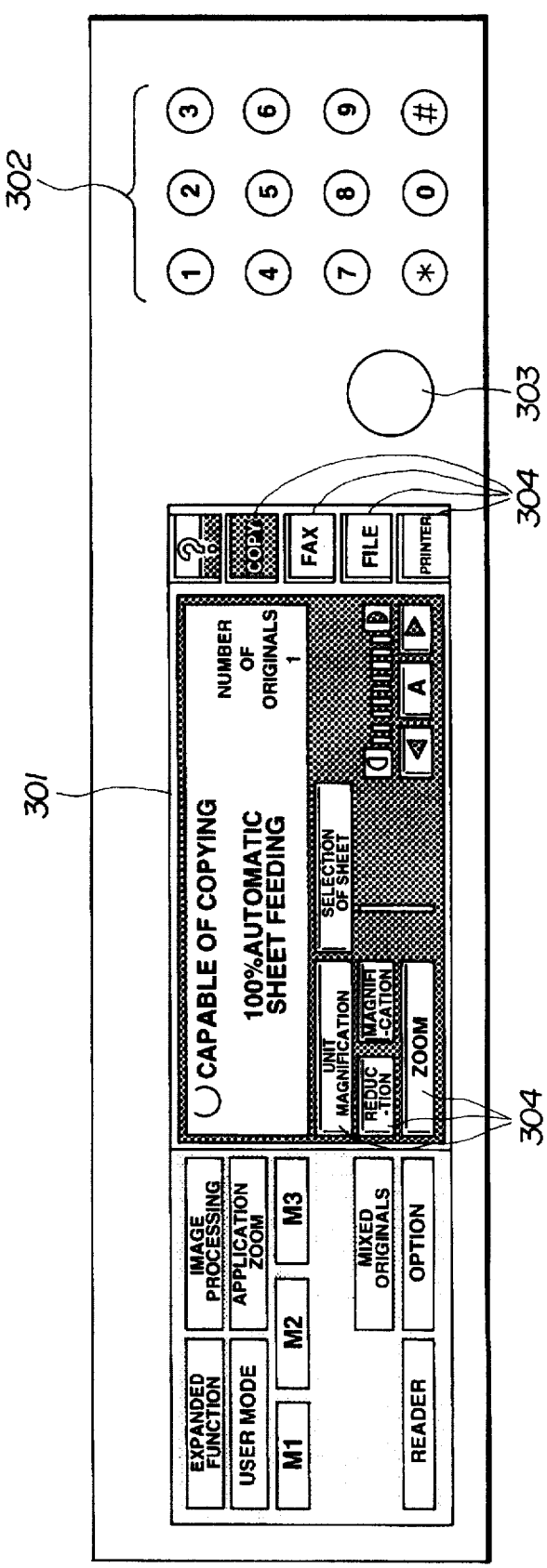
FIG. 3 is a diagram illustrating the configuration of an operation panel.

The image processing unit 110 performs image processing set by an operation panel shown in FIG. 3, the core unit 10, and the like. The image processing unit 110 includes an image memory and has the function of rotating the output direction of an image. The image is rotated according to the same approach as in rotation processing by the formatter unit 8 (to be described later).

The image processing unit 110 includes a selector for switching between outputting an image signal generated from the reader unit 1 to the printer unit 2 or to the external apparatus 3. The image processing unit 110 also includes a selector for switching between inputting an image signal from the reader unit 1 or an image signal from the external apparatus 3. This selector is connected to the printer unit 2. Thus, the printer unit 2 can selectively print an image from the reader unit 1 or an image from the external apparatus 3.

The image signal transmitted from the image processing unit 110 to the printer unit 2 is converted into an optical signal modulated by an exposure control unit 201, and the optical signal illuminates a photosensitive member 202. A latent image formed on the photosensitive member 202 by the optical signal is developed by a developing unit 203. A sheet is fed from a sheet cassette 204 or 205 while adjusting the timing so that the leading edge of the sheet meets the developed image, and the developed image is transferred onto the sheet by a transfer unit 206. The transferred image is fixed on the sheet by a fixing unit 207, and the sheet is discharged outside the apparatus by a sheet-discharging unit 208. The sheet discharged from the sheet-discharging unit 208 is transferred to a sorter 220 when the sorter 220 is connected to the printer unit Z, and onto a sheet-discharging tray (not shown) when the sorter 220 is not connected to the printer unit 2 and the sheet-discharging tray is attached.

Figure 11:
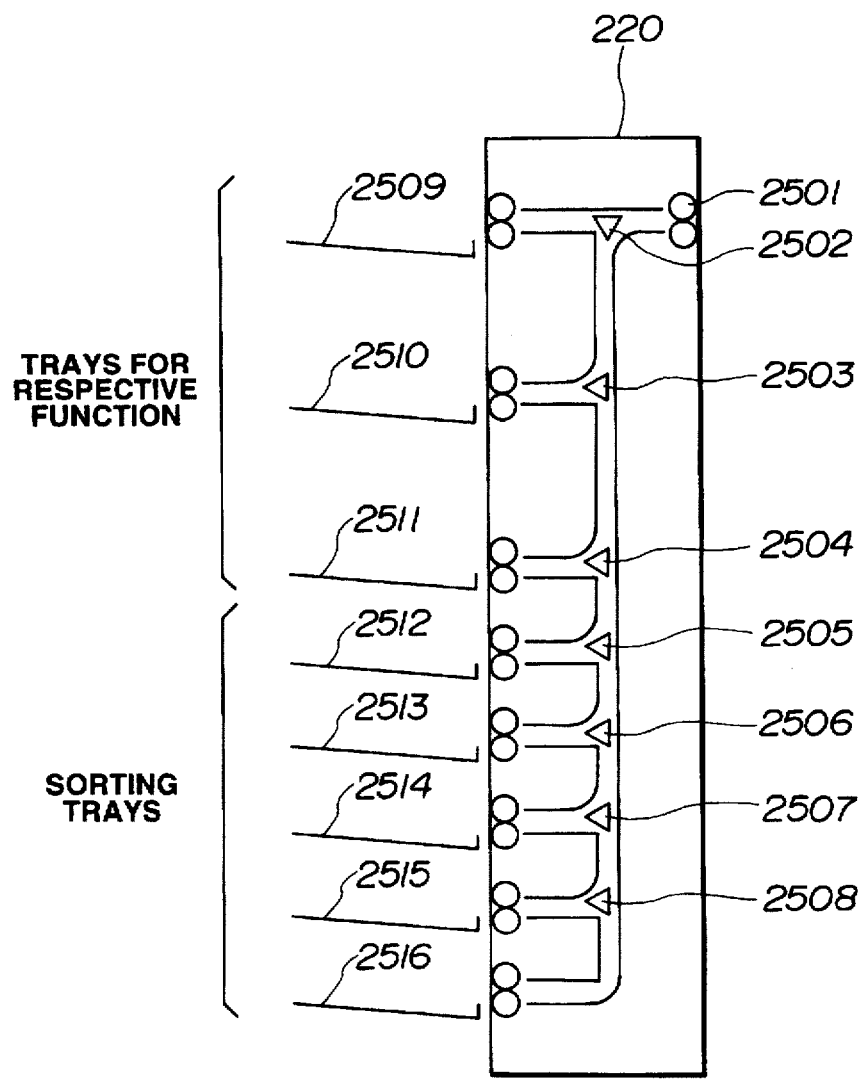
FIG. 11 is a cross-sectional view illustrating the configuration of a sorter.

A description will now be provided of a control operation of the sorter 220 with reference to FIG. 11. When the sorting function is in operation, flappers 2502–2508 are controlled so as to discharge sheets onto trays 2512–2516. When the sorting function is not in operation, sheets are discharged, in principle, onto the uppermost bin 2509. However, according to setting by the user, bins 2509–2511 may be allocated to respective operating functions and sheets may be discharged onto allocated bins. In this embodiment, sheets are discharged onto the bin 2509 in a copying mode, onto the bin 2510 in a facsimile mode, and onto the bin 2511 in a printing mode. The sorter 220 is detachably mounted to the printer unit 2. The sensor 222 for detecting attaching or detaching of the sorter 220 is provided in the printer unit 2.

Next, a description will be provided of a method for sequentially recording read images on two surfaces of a single sheet. Referring to FIG. 2, a sheet on which an image has been fixed by the fixing unit 207 is first fed to the sheet-discharging unit 208. Then, the feeding direction of the sheet is inverted, and the sheet is fed to a unit 210 for mounting a sheet to be refed by a flapper 209 for switching the feeding direction. When the next original has been prepared, the image of the original is read in the above-described manner. The sheet is fed from the unit 210 for mounting a sheet to be refed, and the images of the two originals can be recorded on the two surfaces of the same sheet.

FIG. 3 is a diagram illustrating the configuration of an operation panel provided on the reader unit 1. In FIG. 3, an operational state and messages are displayed on a display unit 301. The surface of the display unit 301 operates as a touch panel, so that the display unit 301 functions as selection keys 304 by touching the surface. Ten keys 302 are used for inputting numerals. By depressing a start key 303, an operation is started.

Next, the operation of the system will be described with reference to the flowcharts shown in FIGS. 4 through 9.

Figure 4:
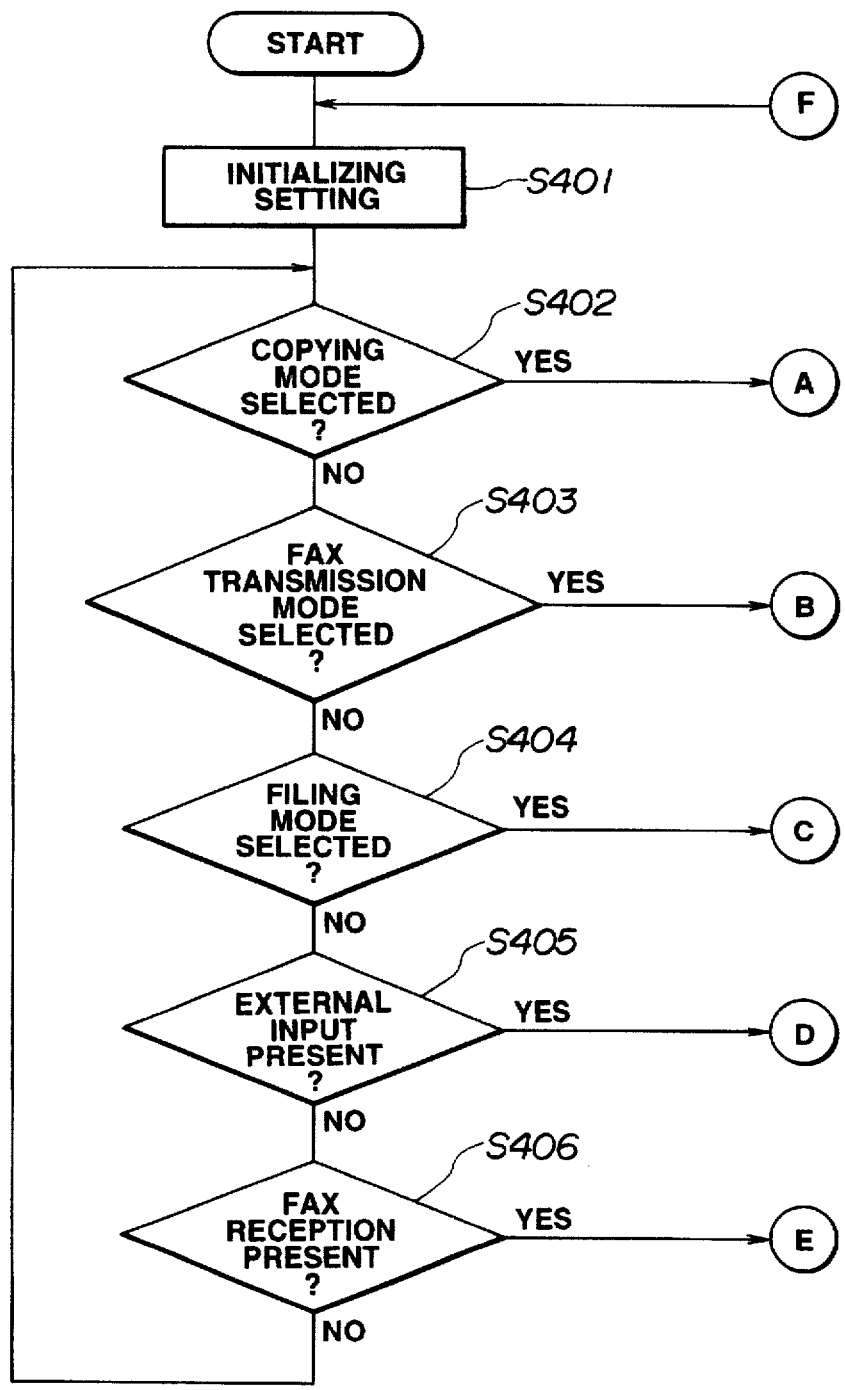
FIG. 4 is a flowchart illustrating operation procedures of the entire system.

FIG. 4 is a flowchart illustrating operation procedures of the entire system.

First, initializing setting is performed after turning on the power supply of the system (step S401). Operational-mode selection keys 304 are displayed on the display unit 301 of the operation panel, and a desired mode is selected by touching the position of the selection key corresponding to the mode. Next, it is determined if the selected mode is a copying mode (step S402). If the result of the determination is affirmative, the process proceeds to subroutine A. If the result of the determination is negative, it is then determined if the selected mode is a facsimile transmission mode (step S403). If the result of that determination in step S403 is affirmative, the process proceeds to subroutine B. If the result of the determination in step S403 is negative, it is determined if the selected mode is a filing mode (step S404). If the result of the determination in step S404 is affirmative, the process proceeds to subroutine C. If the result of the determination in step S404 is negative, it is then determined if the selected mode is a computer input mode for receiving an input from the computer interface unit 7 (step S405). If the result of the determination in step S405 is affirmative, the process proceeds to subroutine D. If the result of the determination in step S405 is negative, it is then determined if the selected mode is a facsimile reception mode (step S406). If the result of the determination in step S406 is affirmative, the process proceeds to subroutine E. If the result of the determination in step S406 is negative, the process returns to step S402, where it is determined if the selected mode is a copying mode, and the above-described processing of determining the selected mode (steps S402–S406) is repeated.

Figure 5:
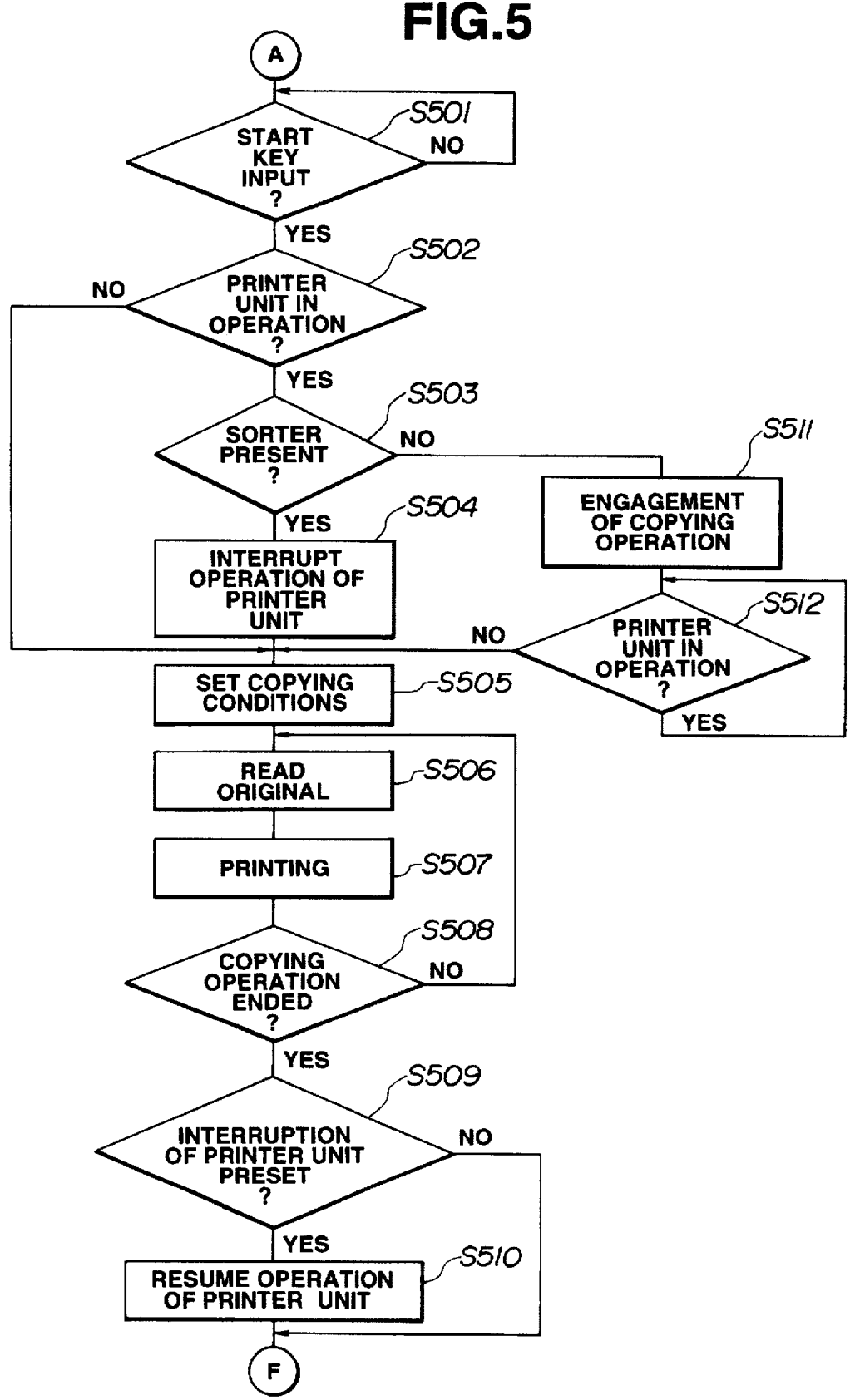
FIG. 5 is a flowchart illustrating operation procedures in a copying mode.

FIG. 5 is a flowchart illustrating processing procedures in the coping mode subroutine A.

First, an input of the start key 303 is awaited by reading the key input through the operation panel (step S501). Upon depression of the start key 303, it is determined if the printer unit 2 is in operation (step S502). If the result of the determination in step S502 is negative, the process proceeds to step S605. If the result of the determination in step S502 is affirmative, it is then determined if the sorter 220 is mounted in the sheet-discharging unit 208 based on the output of the sensor 222 (step S503). If the result of the determination in step S503 is negative, i.e., if the sheet-discharging tray is mounted, the display indicates that the copying operation is to be started upon completion of the operation of the printer unit 2 because the printer unit 2 is in operation (step S511), and completion of the operation of the printer unit 2 is awaited (step S512). Upon completion of the operation of the printer unit 2 in step S512, the process proceeds to the processing of step S505. If the result of the determination in step S503 is affirmative, a setting of temporarily interrupting processing of the printer unit 2 for other than a copying operation takes place (for example, processing of recording an image input from the computer interface unit 7, and processing of recording an image received from the facsimile unit 4) is performed (step S604).

In step S505, copying conditions set through the operation unit are set, and when the sorter 220 is mounted, bins for holding sheets having copied images are set. Then, the original is read (step S506), printing is repeated for a predetermined number of sheets (step S507), and it is determined if the copying operation has been completed (step S508). If the result of the determination in step S508 is affirmative, and if an operation interrupted in step S504 is present, the interrupted operation is resumed (step S510), and the processing in this subroutine is terminated. After completing the processing, the process returns to the state of initializing setting in step S401 shown in FIG. 4.

Figure 6:
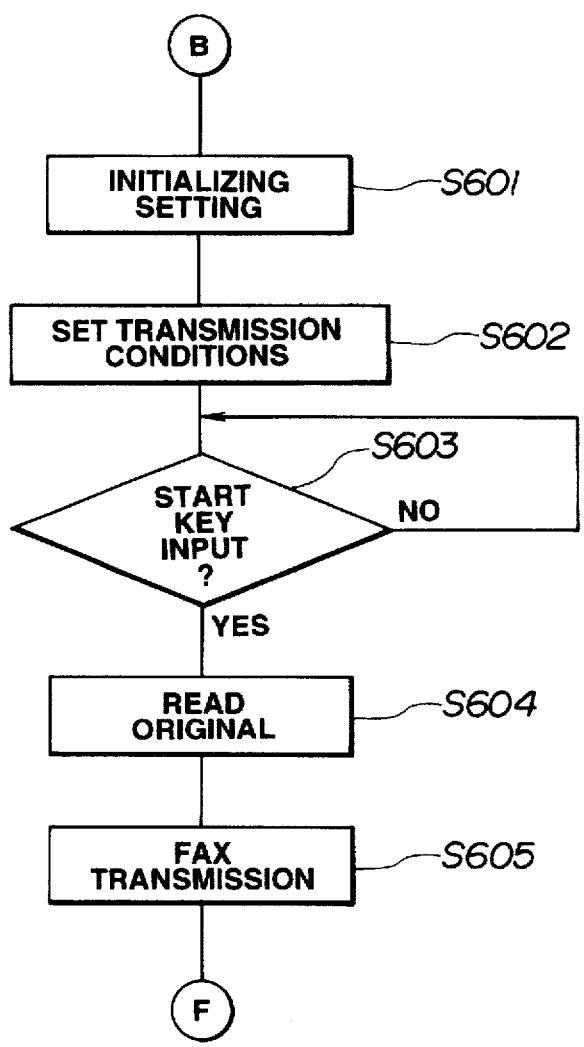
FIG. 6 is a flowchart illustrating operation procedures in a facsimile transmission mode.

FIG. 6 is a flowchart illustrating operation procedures in the facsimile transmission mode.

First, initializing setting of facsimile transmission is performed (step S601). Thereafter, facsimile transmission conditions are set by reading inputs on the keys 301 and 302 (step S602), and then an input of the start key 303 is awaited (step S603). Upon depression of the start key 303, the reader unit 1 reads the original (step S604), and the read image data is transmitted to the facsimile unit 4. The facsimile unit 4 performs facsimile transmission according to the set mode and a determined protocol (step S605). After completing transmission, the process returns to the state of initializing setting in step S401 shown in FIG. 4.

Figure 7:
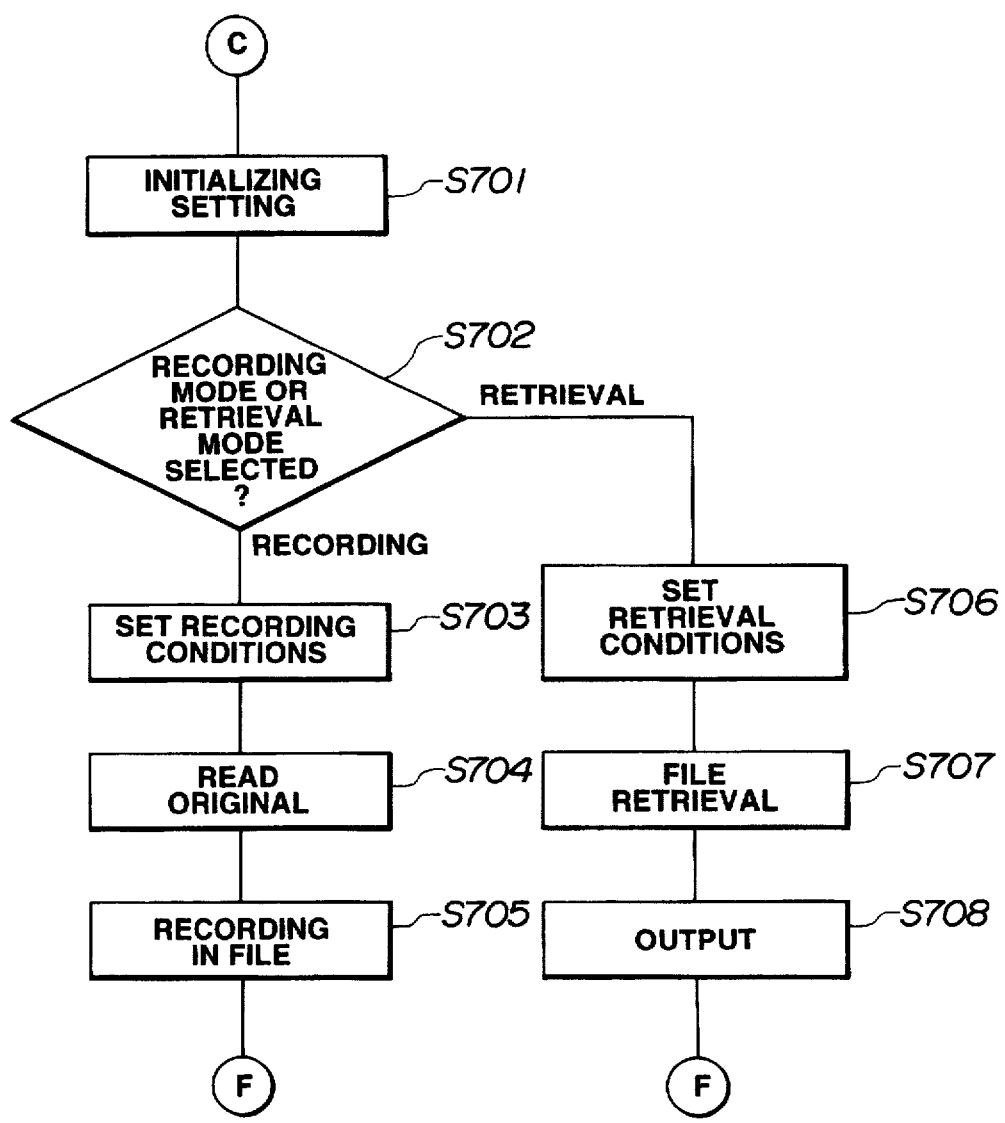
FIG. 7 is a flowchart illustrating operation procedures in a filing mode.

FIG. 7 is a flowchart illustrating operation procedures in the filing mode.

First, initializing setting of a filing operation is performed (step S701). Then, mode selection between file recording mode and file retrieval mode is displayed on the operation panel, and a key input is awaited (step S702). When a recording mode has been selected, recording conditions are set (step S703), and then the reader unit 1 reads the original (step S704). Thereafter, data is transmitted to the filing unit 5, which records the data in the external storage device 6 (step S705). When a file retrieval mode has been selected in step S702, retrieval conditions are set (step S706), and file retrieval from the external storage device 6 is performed (step S707), and the result of the retrieval is output (step S708). After completing the recording in step S705 or the retrieval in step S708, the process returns to the state of initializing setting in step S401 shown in FIG. 4.

Figure 8:
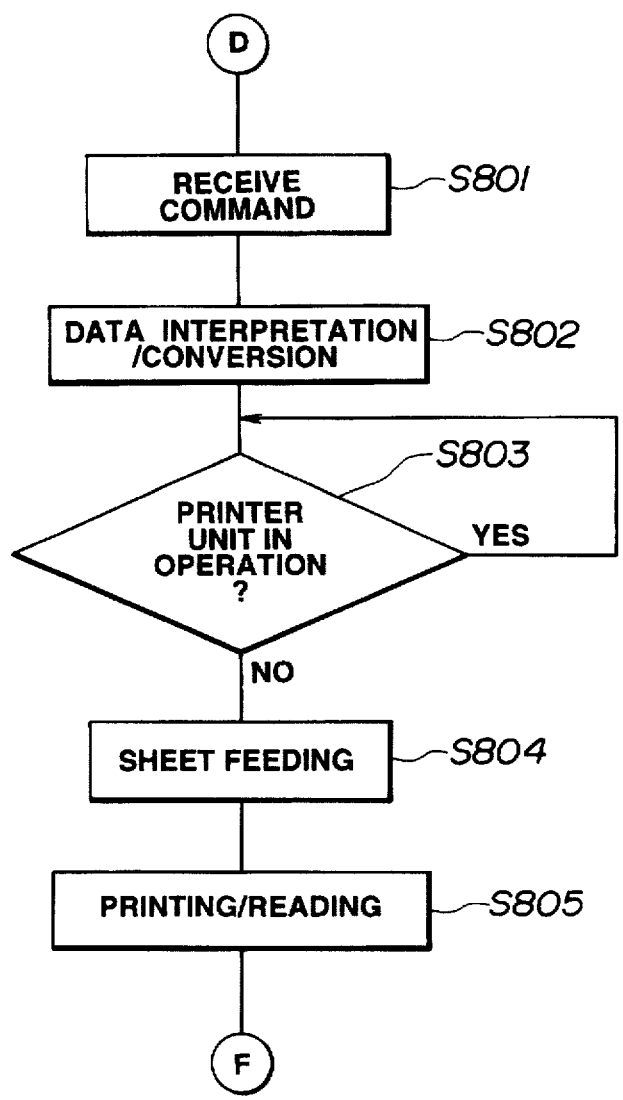
FIG. 8 is a flowchart illustrating operation procedures in a mode of input from a computer interface.

FIG. 8 is a flowchart illustrating operation procedures in the computer input mode (printing mode).

First, a command is received by the computer interface unit 7 (step S801). Received data is transmitted to the formatter unit 8 via the core unit 10. The formatter unit 8 interprets the contents of the data, and develops the received information in a bit-map memory (step S802). Then, it is determined if the printer unit 2 is in operation, and completion of the operation is awaited (step S803). Upon completion of the operation, an appropriate sheet is selected, and feeding of the sheet is started (step S804). The sheet is fed from the cassette 204 or 205, and is conveyed to the transfer unit 206, where the image developed in the bit-map memory in step S802 is read by rotating the image in accordance with information, such as the direction and the size of the sheet, and the like, according to a method which will be described later. The read image information is transmitted to the exposure control unit 201 and is printed (step S805). In a printing operation, if the sheet-discharging device 220 is mounted, printing is performed by transmitting information relating to the sheet-discharging position of the printer assigned by the user, and the like. The printing operation is the same as in the above-described respective operation procedures. After outputting the data, the process returns to the state of initializing setting in step S401 shown in FIG. 4.

Figure 12A:
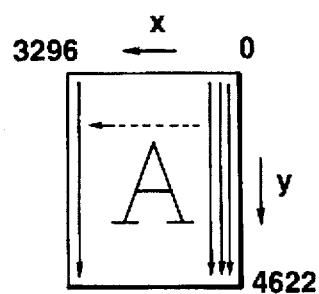
FIGS. 12(a), 12(b), 12(c) and 12(d) are diagrams illustrating methods of reading an image by rotating it.
Figure 12B:
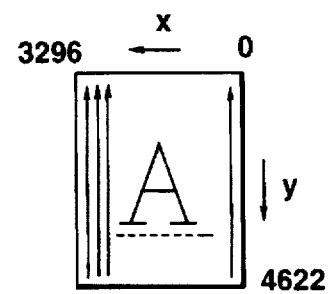
Figure 12C:
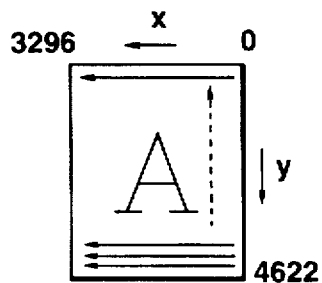
Figure 12D:
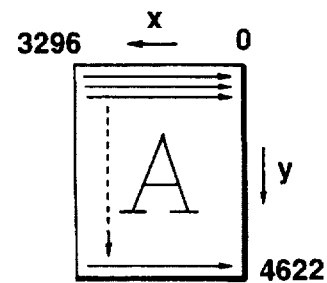

Next, a description will be provided of a method for reading the image while rotating it, with reference to FIGS. 12(a) through 12(d). The image developed in the bit-map memory in the processing of step S802 is as shown in FIGS. 12(a) through 12(d). In this case, the image is developed in the A4 size in the form of a bit map comprising 4622 pixels in the longitudinal direction with a size of 297 mm, and 3296 pixels in the lateral direction with a size of 210 mm. When reading the image without rotating it, as shown in FIG. 12(a), the image is read in the sequence of (0, 0)→(0, 4622), (1, 0)→(1, 4622), . . . . When reading the image by rotating it by 180 degrees, as shown in FIG. 12(b), the image is read in the sequence opposite to the case of FIG. 12(a) as (3296, 4622)→(3296, 0), (3295, 4622)→(3295, 0), . . . . When reading the image by rotating it by −90 degrees, as shown in FIG. 12(c), the image is read in a lateral direction in the sequence of (0, 4622)→(3296, 4622), (0, 4621)→(3296, 4621), . . . . When reading the image by rotating it by 90 degrees, as shown in FIG. 12(d), the image is read in the sequence opposite to the case of FIG. 12(c) as (3296, 0)→(0, 0), (3296, 1)→(0, 1), . . . . Such rotation control is configured in the formatter unit 8.

Figure 9:
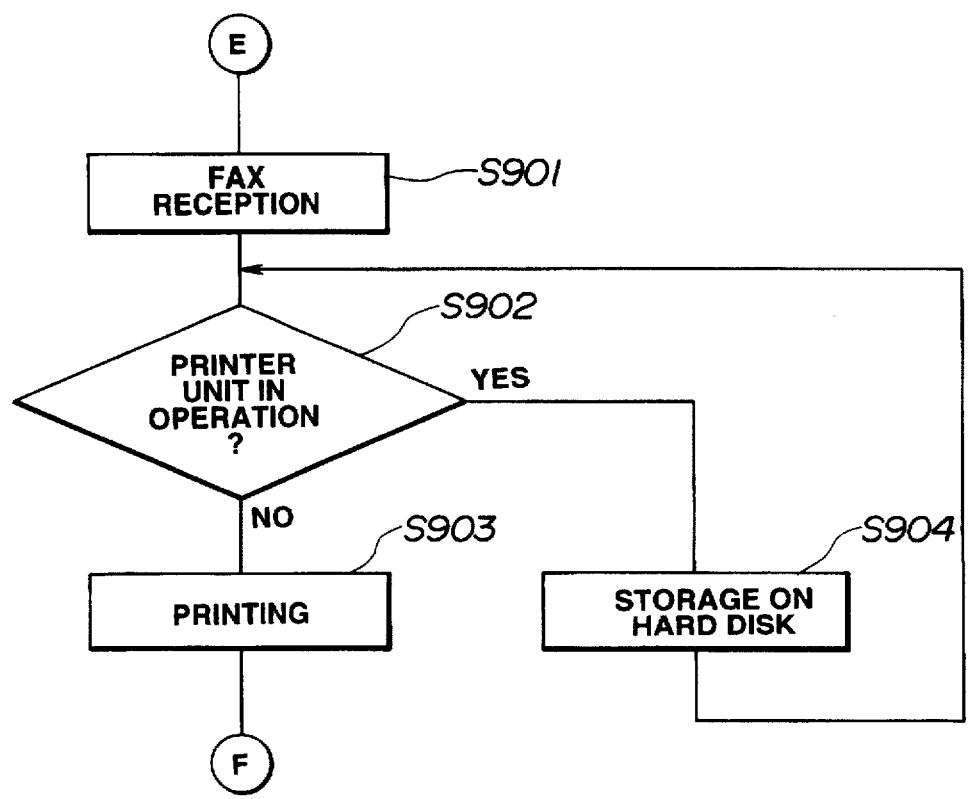
FIG. 9 is a flowchart illustrating operation procedures in a facsimile reception mode.

FIG. 9 is a flowchart illustrating operation procedures in the facsimile reception mode. First, facsimile reception is performed by the facsimile unit 4 (step S901), and it is determined if the printer unit 2 is in operation (step S902). If the result of the determination in step S902 is negative, received data is transmitted to the printer unit 2, which prints the data (step S903). In a printing operation, if the sheet-discharging device 220 is mounted, printing is performed by transmitting information relating to the discharging position of a facsimile sheet assigned by the user, and the like. If the result of the determination in step S902 is affirmative, the data is stored in a hard disk 4a of the facsimile unit 4 (step S904), and is printed when the printing unit 2 is not in operation (steps S902 and S903). After completion of printing, the process returns to the state of initializing setting in step S401 shown in FIG. 4.

The operation of the system is performed either by selecting one of the above-described modes using the selection key 301 of the operation panel, by receipt of a facsimile transmission by the facsimile unit 4, or by detecting a command from an external PC (personal computer)/WS (work station) by the computer interface unit 7.

Some of the above-described operations may be performed simultaneously by combining them, or performed independently. Setting of a priority order, and the like are controlled by the core unit 10.

Figure 10:
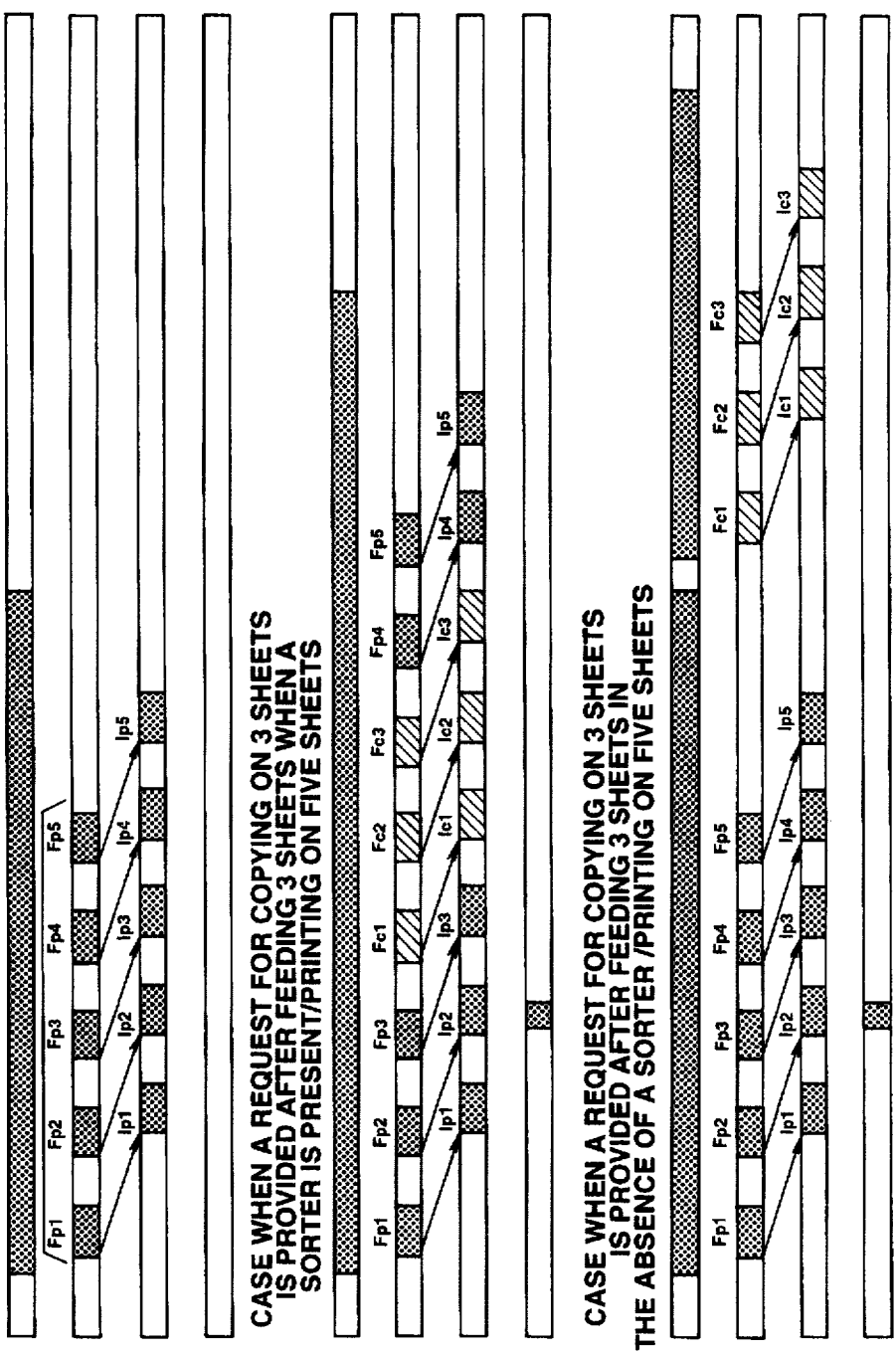
FIGS. 10(a) 10(b) and 10(c) are timing charts in the embodiment.

A description will now be provided of timing charts in the present embodiment with reference to FIGS. 10(a) through 10(c). In FIGS. 10(a) through 10(c), a printing signal indicates that the printer unit 2 is in operation, sheet feeding indicates a sheet-feeding start signal, image output indicates a signal for reading an image signal and forming the corresponding image on a sheet, request to copy indicates a signal generated when start of a copying operation is requested through the start key or the like.

FIG. 10(a) illustrates a case when a printing output (printing by operating the printer unit 2 by a request from the external apparatus 3, the same definition being applied to FIGS. 10(b) and 10(c)) is performed on five sheets.

A command from a host computer is received by the computer interface unit 7, and data is transmitted to the formatter unit 8 via the core unit 10. The formatter unit 8 interprets the data and develops the received information in the bit-map memory. Then, an appropriate sheet is selected, and a request of the printing output is transmitted to the core unit 10, which requests the printer unit 2 to start feeding of the sheet (Fp1). The sheet is thereby fed to the transfer unit 206, the image developed in the bit-map memory is read, and the read image is formed on the sheet (Ip1). In parallel to this processing, data of the next page is received, and the above-described processing is repeated. Thus, remaining sheets are fed (Fp2-Fp5), and images are formed on the fed sheets (Ip2-Ip5). When the sorter 250 is mounted, information relating to discharging bins assigned by the user is transmitted to the printer unit 2, which performs the above-described processing of discharging sheets onto the assigned discharging bins.

FIGS. 10(b) and 10(c) illustrate timing charts when the sorter 220 is mounted and not mounted, respectively, when a request to copy is issued after feeding the third sheet (Fp3).

In FIG. 10(b), when a request to copy has been issued after feeding the third sheet (Fp3), the core unit 10 interrupts a printing output after outputting a third image, and sets copying conditions for the reader unit 1 and the printer unit 2. The reader unit 1 and the printer unit 2 set copying conditions and information relating to discharging bins for copies set by the user, and sheets are fed (Fc1-Fc3. The reader unit 1 scans the original in accordance with the fed sheet and the copying conditions, and images are formed by the printer unit 2 (Ic1-Ic3).

When the final sheet has been fed (Fc3), the core unit 10 feeds sheets (Fp4 and Fp5) while transmitting a request for a printing output to the printer unit 2 in order to resume the interrupted printing output, and images are formed (Ip4 and Ip5). During this operation, the driving of the sheet-feeding device is not interrupted so as to feed S the sheets continuously (Fp1-Fp3, Fc1-Fc3, Fp4-Fp5).

In FIG. 10(c), when a copying request has been issued after feeding the third sheet (Fp3), the core unit 10 registers a job request of a copying operation in a job table (not shown) present in a predetermined region of a RAM (random access memory) for work within the core unit 10.

After the registering, sheets are fed in response to a request of a printing output from the formatter unit 8 (Fp4 and Fp5), and images are formed (Ip4 and Ip5). The core unit 10 monitors that the printer unit 2 completes a printing output of the final page and a printing signal is off, executes the job of the copying operation registered in the job table, and sets copying conditions for the reader unit 1 and the printer unit 2. The reader unit 1 and the printer unit 2 select the type of sheets from the set copying conditions and the like, and feed sheets of the selected type (Fc1-Fc3). The reader unit 1 scans the original in accordance with the fed sheet, and images are formed by the printer unit 2 (Ic1-Ic3).

By changing control in accordance with mounting or detaching of the sheet-discharging device in the above-described manner, it is possible to discharge sheets without mixing them even if a copying operation is accepted while sheets are being output in a printing operation, a facsimile operation or the like, and to reduce waiting time for a copying operation.

As described above, sheets can be discharged without being interspersed even if a copying operation is accepted during a printing operation, a facsimile operation or the like, and waiting time for a copying operation can therefore be reduced.

Although in the above-described embodiment, priority is given to a copying operation, the present invention encompass any priority order among the copying mode, the printing mode, the facsimile mode and the filing mode.

The present invention may also be applied to a case in which a second job interrupts while a first job is executed (while images of a first group are formed) in the same mode, as well as to a case in which a second mode interrupts while a first mode is executed.

The individual components shown in outline or designated by blocks in the drawings are all well known in the image forming apparatus arts and their specific construction and operation are not critical to carrying out the invention.

While the present invention has been described with respect to what is presently considered to be the preferred embodiment, it is to be understood that the invention is not limited to the disclosed embodiments. To the contrary, the present invention is intended to cover various modifications and equivalent arrangements included within the spirit and scope of the appended claims.

What is claimed is:

1. An image forming apparatus comprising:

image forming means for forming an image on a sheet from one of at least a first group and a second group;

sorting means including a plurality of accommodating units for sorting sheets on which images have been formed by said image forming means, said sorting means being detachably attached to said image forming means;

first control means for allowing image formation from the second group by interrupting image formation from the first group upon reception of an interrupt instruction, thereby allowing image formation from the second group to proceed while image formation of images from the first group is suspended, and for resuming the image formation of images from the first group after the image formation from the second group has been completed;

second control means for changing units to accommodate sheets in said sorting means so as to accommodate sheets on which images of the first group have been formed and sheets on which images of the second group have been formed in different accommodating units in accordance with the interrupt instruction;

detection means for detecting whether said sorting means is attached; and prohibition means for prohibiting interrupt of image formation of the second group during image formation of the first group when said detection means detects a detaching of said sorting means.

2. An apparatus according to claim 1, wherein the image formation of the first group comprises image formation in a first mode, and wherein the image formation of the second group comprises image formation in a second mode.

3. An apparatus according to claim 2, wherein the first and second modes comprise either ones of a printing mode in which an image from a computer is formed, a copying mode in which an image of an original is formed, a facsimile mode in which an image received by facsimile communication is formed, and a filing mode in which a retrieved image is formed.

4. An apparatus according to claim 1, wherein the images of the first group and the images of the second group are images from different image generating sources.

5. An image forming apparatus comprising:

image forming means for forming on a sheet an image from one of at least a first group and a second group;

control means for allowing image formation from the second group by interrupting image formation from the first group upon reception of an interrupt instruction, thereby allowing image formation of images from the second group to proceed while image formation of images from the first group is suspended, and for resuming the image formation of the first group after the image formation from the second group has been completed;

detection means for detecting a presence or absence of sorting means for sorting sheets on which images have been formed by said image forming means; and prohibition means for prohibiting an interrupt of image formation from the second group during image formation from the first group when said detection means detects an absence of said sorting means.

6. An image forming apparatus comprising:

image forming means for forming images on sheets;

determination means for determining whether sorting of the sheets by sorting means is possible, said sorting means operating interrelatedly with said image forming apparatus; and control means for allowing an image formation job before a preceding image formation job is completed when said determination means determines that sorting by said sorting means is possible, and for inhibiting an image formation job before the preceding image formation job is completed when said determination means determines that sorting by said sorting means is not possible.

7. An apparatus according to claim 6, wherein said determination means performs determining by detecting attaching and detaching of said sorting means.

8. An apparatus according to claim 6, wherein each of said jobs is performed in a mode selected from printing mode for printing an image from a computer, copying mode for forming an image from an original, facsimile mode for forming an image received by facsimile communication, and file mode for forming a searched image.

9. A method of controlling an image forming apparatus comprising the steps of:

forming an image on a sheet;

determining whether sorting of the sheet by sorting means is possible or not, said sorting means operating interrelatedly with said image forming apparatus; and allowing an image formation job before a preceding image formation job is completed when said determination of whether sorting by said sorting means is possible, and inhibiting an image formation job before the preceding image formation job is completed when said determination of whether sorting by said sorting means is not possible.

10. A method according to claim 9, wherein said determination is performed by detecting attaching and detaching of said sorting means.

11. A method according to claim 9, wherein each of said jobs is performed in a mode selected from printing mode for printing an image from a computer, copying mode for forming an image from an original, facsimile mode for forming an image received by facsimile communication, and file mode for forming a searched image.

12. An image forming apparatus comprising:

image forming means for forming images on sheets;

determination means for determining whether a sorting function by sorting means is available, said sorting means operating in association with said image forming apparatus; and control means for starting an image formation job before a preceding image formation job is completed when said determination means determines that the sorting function by said sorting means is available, and for starting an image formation job after the preceding image formation job is completed when said determination means determines that the sorting function by said sorting means is not available.

13. An apparatus according to claim 12, wherein said determination means performs determining by detecting attaching and detaching of said sorting means.

14. An apparatus according to claim 12, wherein each of said jobs is performed in a mode selected from one of a printing mode for printing an image from a computer, a copying mode for forming an image from an original, a facsimile mode for forming an image received by facsimile communication, and a file mode for forming an image from a searched database.

15. An apparatus according to claim 12, wherein said control means receives a request of another image formation job during the preceding image formation job.

16. A method of controlling an image forming apparatus comprising the steps of:

forming an image on a sheet;

determining whether a sorting function by sorting means is available, said sorting means operating in association with said image forming apparatus; and starting an image formation job before a preceding image formation job is completed when it is determined that the sorting function by said sorting means is available, and starting an image formation job after the preceding image formation job is completed when it is determined that the sorting function by said sorting means is not available.

17. A method according to claim 16, wherein said determination is performed by detecting attaching and detaching of said sorting means.

18. A method according to claim 16, wherein each of said jobs is performed in a mode selected from a printing mode for printing an image from a computer, a copying mode for forming an image from an original, a facsimile mode for forming an image received by facsimile communication, and a file mode for forming an image from a searched database.

19. A method according to the claim 16, wherein a request of another image formation job is received during the preceding image formation job.

* * * * *

UNITED STATES PATENT AND TRADEMARK OFFICE
CERTIFICATE OF CORRECTION

PATENT NO. : 5,729,791
DATED : March 17, 1998
INVENTOR(S) : Satoru KUTSUWADA, et al.

It is certified that error appears in the above-identified patent and that said Letters Patent is hereby corrected as shown below:

Column 1, line 30, delete "soft" and insert therefor --sort--;
        Line 32, after "printing", insert --operation--;
        Line 55, delete "commodating".

Column 5, line 31, delete "S604" and insert therefor --S504--.

Column 7, line 39, delete "250" and insert therefor --220--;
        Line 52, after "Fc3", insert a parentheses (")"); and
        Line 61, delete "S".

Column 8, line 26, delete "pass" and insert therefor --passes--.

Signed and Sealed this

Thirteenth Day of October 1998

Attest:

BRUCE LEHMAN

Attesting Officer      *Commissioner of Patents and Trademarks*